United States Patent
McKinney

(10) Patent No.: US 9,499,412 B1
(45) Date of Patent: Nov. 22, 2016

(54) SPARSE DATA FOR SMALL ENVIRONMENTAL SYSTEMS AND METHOD

(71) Applicant: Jerry L. McKinney, Silsbee, TX (US)

(72) Inventor: Jerry L. McKinney, Silsbee, TX (US)

( * ) Notice: Subject to any disclaimer, the term of this patent is extended or adjusted under 35 U.S.C. 154(b) by 554 days.

(21) Appl. No.: 13/871,339

(22) Filed: Apr. 26, 2013

(51) Int. Cl.
*C02F 1/00* (2006.01)
*G05D 7/06* (2006.01)

(52) U.S. Cl.
CPC ............ *C02F 1/008* (2013.01); *G05D 7/0635* (2013.01); *C02F 2209/005* (2013.01); *C02F 2209/40* (2013.01)

(58) Field of Classification Search
CPC .... G05D 7/00; G05D 7/0629; G05D 7/0635; C02F 1/00; C02F 1/006; C02F 1/008; C02F 2209/00; C02F 2209/005; C02F 2209/40; C02F 2209/42; C02F 2209/44
USPC .......................... 700/282; 137/101.19, 115.02
See application file for complete search history.

(56) References Cited

U.S. PATENT DOCUMENTS

| | | | | |
|---|---|---|---|---|
| 7,075,425 B2 * | 7/2006 | Capano | .................. | G05B 15/02 340/531 |
| 8,338,182 B2 * | 12/2012 | Halden | .................... | G01N 1/16 204/194 |
| 8,594,851 B1 * | 11/2013 | Smaidris | .................. | G05D 9/12 137/101.19 |
| 8,600,568 B2 * | 12/2013 | Smaidris | ................. | C02F 1/008 137/101.19 |
| 8,691,582 B2 * | 4/2014 | Halden | ................... | G01N 33/24 436/25 |
| 8,983,667 B2 * | 3/2015 | Smaidris | ................. | C02F 1/006 137/101.19 |
| 2003/0066804 A1 * | 4/2003 | Tipton | ....................... | E03F 3/02 210/739 |
| 2007/0106525 A1 * | 5/2007 | McKinney | ............. | G06Q 10/06 705/7.41 |
| 2007/0106527 A1 * | 5/2007 | McKinney | ............. | G06Q 10/06 705/7.41 |
| 2011/0307106 A1 * | 12/2011 | Dutt | .......................... | E03F 7/00 700/282 |
| 2012/0222994 A1 * | 9/2012 | Smaidris | ................. | C02F 1/008 210/97 |
| 2013/0243614 A1 * | 9/2013 | Moon | ....................... | F17D 3/00 417/63 |
| 2014/0048156 A1 * | 2/2014 | Smaidris | ................. | C02F 1/006 137/395 |
| 2015/0158739 A1 * | 6/2015 | Smaidris | ................. | C02F 1/006 210/744 |

* cited by examiner

*Primary Examiner* — Charles Kasenge
(74) *Attorney, Agent, or Firm* — Bushman Werner, P.C.

(57) ABSTRACT

A sparse data system determines regulatory compliance of a plurality of small environmental systems that utilize a respective plurality of pumps. Each environmental system utilizes a universally programmed dialer configured to receive, store, and transmit pump operation data. A server is configured to utilize the time of operation of the pumps and separately provided installer information such as installer determined pump flow rates and permitted thresholds of operation of the environmental systems to provide a regulatory body with processed data indicative of whether the environmental systems are in compliance with their permitted thresholds. The dialers limit the number of connections with the server to periodically connecting to the server only after a predetermined time period or predetermined events.

28 Claims, 1 Drawing Sheet

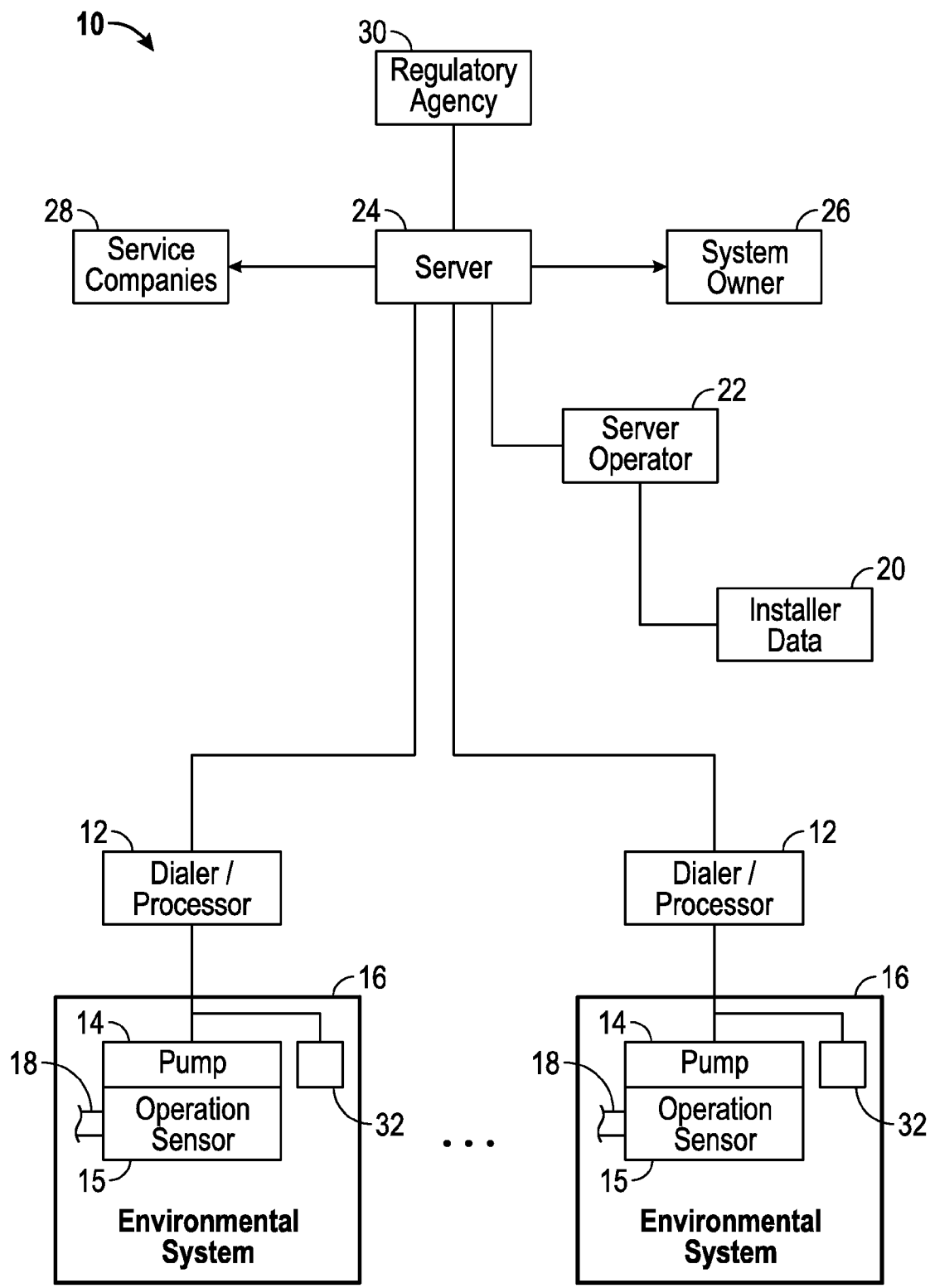

SPARSE DATA FOR SMALL ENVIRONMENTAL SYSTEMS AND METHOD

BACKGROUND OF THE INVENTION

Field of the Invention

The present invention relates generally to environmental equipment and, in one embodiment, to a low cost environmental compliance system method that may be utilized for monitoring a large number of often wide spread and in some cases identical environmental equipment systems, which typically are permitted to process less than 5000 gallons of wastewater per day.

Description of the Prior Art

Relatively small homeowner or business owner wastewater treatment systems allow builders and owners the ability to build in a wider range of locations while avoiding environmental damage than would otherwise be possible if reliance on larger municipal systems were required.

While environmental regulation agencies advocate keeping costs as low as practical for system owners, thereby promoting economic growth, there is also a need for the agencies to be able to oversee large numbers of small treatment systems to prevent environmental damage that can occur if the systems are not inspected at regular intervals, are overloaded, or otherwise not operating at optimal levels.

U.S. Pat. No. 8,386,303, to the present inventor, which is incorporated herein by reference, issued Feb. 26, 2013, provides a sparse data system for verifying operational compliance of a plurality of environmental systems. To reduce operational costs to a minimum, the quantity of data transmitted is minimized and the data is only transmitted at certain times. In one embodiment, if systems are compliant, then information is preferably not sent. If systems are non-compliant, then notices are sent to parties of interest at effectively the same time as the noncompliance occurs. Subsequent alarms may also be sent after detection of an operational threshold to provide notice for continued ongoing or severe noncompliance.

The treatment systems described above utilize entry of data and/or programming comprising a permitted threshold for a predetermined amount of wastewater to be treated within a predetermined period of time within the processors for each of the permitted environmental systems. As well, one embodiment of the system would require entry of data that describes the amount of fluid flow produced by a pump wherein the time of the pump operation is utilized to determine the amount of fluid processed by the system within the predetermined period of time.

This type of information is not necessarily predetermined or known to the system manufacturer and therefore cannot be provided when the systems are produced or shipped to installers, who may order larger numbers of systems for installation as needed. The system installers may not be qualified to input this information. Moreover, even identical pumps may vary significantly in the amount of fluid produced depending at least partially on installation factors such as the size and length of pipes used for installing the systems. As well, site specific information such as fluid flow by the pump will often change over time due to pump wear, different operating characteristics, and the like.

The present invention incorporates herein by reference the following other patents from the present inventor including: U.S. Pat. Nos. 7,149,701; 7,525,420; and 7,945,471.

The solutions to the above described issues and/or related problems have been long sought without success. Consequently, those skilled in the art will appreciate the present invention that addresses the above and other problems.

SUMMARY OF THE INVENTION

It is a general object of the present invention to provide an improved sparse data system for small environmental systems.

Another possible object of the present invention is to provide a sparse data system that does not require different programming or data input during installation or subsequent updates to the original installation.

Another possible object of the present invention is to provide a server that can utilize data from an environmental system and separately provided installation or installer data, which is site specific information, that can be input to the server so that when the data transmitted from the environmental system is combined with the installation or installer data the server is able to determine regulatory compliance of each of a large number or multitude of environmental systems.

Another possible object of the present invention is to provide more limited data transfer times from the small environmental systems to the server.

Accordingly, the present invention provides a method of determining regulatory compliance of a plurality of environmental systems. In one embodiment, the method provides steps such as providing that the plurality of environmental systems are operable for processing, e.g., treating and/or discharging, less than 5000 gallons of wastewater per day or other designated time period, providing a plurality of pumps for the plurality of environmental systems, and providing the plurality of environmental systems with a plurality of universal dialers wherein each universal dialer comprises a processor operatively connected to a respective pump. In one embodiment, the universal dialers are configured to receive and transmit pump operation data related to operation of the respective pump without processing the pump operation data to determine compliance with the permitted threshold.

Other steps may comprise configuring the processor to operate each respective universal dialer to periodically connect to a server upon a first occurrence of at least one of a predetermined time period or a predefined event, and when connected, to transmit the pump operation data. In one embodiment, at a minimum, all data not previously transmitted is transmitted either at each predetermined time period or predefined event. The method may comprise configuring the server to receive installer data, also referred to herein as installation data or site specific data, that can comprise the permitted threshold for each of the plurality of environmental systems and utilizing the server to determine whether each respective of the plurality of environmental systems is in compliance with the permitted threshold. The method may comprise configuring the server to provide authorized third parties, such as the regulatory body, with processed data indicative of whether the environmental system is in compliance with the permitted threshold.

The method may further comprise providing that if the processor operates the respective universal dialer to transmit the pump operation data due to the predefined event, then a subsequent predetermined time period begins with the predetermined or predefined event.

The method may comprise providing that the installer data comprises a respective pump flow rate of each of the plurality of pumps. The method may comprise that the pump operation data comprises time of operation, number of cycles of operation, or the like, for each of the plurality of pumps. The server can be programmed to determine a volume of fluid processed for a selected period of treatment time utilizing the respective pump flow rate, volume per cycle, or the like of each of the plurality of pumps and the time of operation or number of cycles for each of the plurality of pumps.

The method may comprise providing that the server is programmed to provide the regulatory body with a record of compliance comprising a volume of fluid processed for a selected number of the predetermined periods of treatment time.

The method can comprise providing that the server is selectively programmed to provide the regulatory body with a record of only non-compliant predetermined periods of treatment time.

In another embodiment, the method may comprise providing that the plurality of environmental systems are operable for processing less than 5000 gallons of wastewater per day or other designated period, providing a plurality of pumps for the plurality of environmental systems, providing the plurality of environmental systems with a plurality of universally programmed dialers wherein each dialer comprises a processor operatively connected to a pump and is configured to receive and transmit pump operation data that may comprise effective time of operation of the pump such as pump time or number of cycles, and configuring the processor to connect to a server without regard to a respective permitted threshold for a respective environmental system.

In another embodiment, the present invention provides a system for determining regulatory compliance of a plurality of environmental systems. The system can comprise components such as a plurality of pumps for the plurality of environmental systems and a plurality of universally programmed dialers for the plurality of environmental systems wherein each of the plurality of universally programmed dialers may comprise a processor operatively connected to at least one respective pump of the plurality of pumps. Each of the plurality of universally programmed dialers can be configured to receive and transmit pump operation data.

The processor is configured for connecting a respective dialer to the server without regard to a respective permitted threshold for a respective environmental system. The processor can be configured to operate the dialer to periodically connect to a server upon a first occurrence of at least one of a predetermined time period or a predefined event, and when connected, to transmit the pump operation data for the plurality of environmental systems, which has not yet been transmitted. The server is configured to process the pump operation data received from the plurality of environmental systems. The server can be configured to provide the regulatory body with processed data indicative of whether the environmental system is in compliance with the permitted threshold.

The server can be selectively operable by the regulatory body to provide the regulatory body with a record of only non-compliant predetermined periods of treatment time. In one embodiment, the method may comprise updating the installer data, such as site specific information, utilized for at least one specific environmental system by the server to interpret pump operation data in a manner that affects a determination of whether the specific environmental system is in compliance with the permitted threshold. For example, the method may comprise updating site specific information to revise a pump flow rate for the specific environmental system.

BRIEF DESCRIPTION OF THE DRAWING

A more complete understanding of the invention and many of the attendant advantages thereto will be readily appreciated as the same becomes better understood by reference to the following detailed description when considered in conjunction with the accompanying drawing, wherein like reference numerals refer to like parts and wherein:

The FIGURE is a schematic for a sparse data environmental equipment system in accord with one possible embodiment of the present invention.

DESCRIPTION OF THE PREFERRED EMBODIMENT

The present invention provides a sparse data environmental system 10 that is operable for use with less expensive mass produced environmental systems 16 and/or universal dialers 12 that do not require internally contained information concerning permitted thresholds of operation and/or pump flow rate information. On the other hand, the sparse data system utilizes data from the environmental systems and externally provided data which is combined information during server operation to provide suitably detailed information for use by regulatory bodies to effectively prevent environmental damage. Accordingly, the present invention provides an important improvement in environmental system technology.

Referring now to the drawing there is a schematic overview showing the basic interconnections of sparse data environmental equipment system 10 in accord with one possible embodiment of the invention. System 10 may comprise thousands or tens of thousands or more of environmental systems 16 that may be widely scattered to make physical monitoring by limited numbers of regulatory personnel difficult or effectively impossible. In one embodiment, relatively small environmental systems 16 are operable to process less than 5000 gallons of wastewater per a designated time period such as per day. The processed wastewater may be treated, discharged, or both. Accordingly, the systems can be designed to reliably handle less than 5000 gallons assuming the systems are properly maintained.

In this embodiment, dialer/processors 12 may comprise substantially identical or identical equipment that is programmed substantially identically or identically by the manufacturer that may be referred to herein as universal dialers, universally programmed dialers, standardized dialers, a standardized program, duplicate programs, duplicate software and/or duplicate hardware, duplicate dialers, or the like. In this way, construction is simplified; the same or essentially the same programming is used. In a preferred embodiment, the installers do not need to input data and/or change the programming of the universal dialer/processors 12. Installer personnel may or may not also be from service companies or system manufacturers. It will be understood that system 10 is not limited to use of identical dialers and/or identical programming and could accommodate different but suitably programmed dialers that are operable to perform the functions discussed herein. Moreover, the installation may comprise installation of new dialers onto previously installed environmental systems.

Each dialer/processor 12 is associated with one of a plurality of environmental systems 16. Environmental systems 16 typically comprise one or more pumps 14 with pump operation sensors 15. The pumps are installed using various sizes and lengths of pipes 18. Due to variations in pipe length and size and/or other factors even identical pumps 14 will have different pump flow rates in different but often otherwise identical environmental systems 16. Accordingly, even identical systems 16 may have different operating characteristics due to installation factors.

The dialer/processors 12 comprise at least one processor programmed for uploading pump operation data and/or other data produced by the system, some types of which are discussed subsequently. The dialers may communicate with server 24 over land lines, cellular phone connections, pagers, data lines, power lines, wirelessly or hardwired, or by communication means that are used for data transmission functions. One advantage of the present invention is reduced costs for data transmission due to fewer communications.

Dialer/processors 12 are also operatively connected to pump operation sensors 15 that detect pump 14 operation. The pump operation sensors may be of many different types. As one example, pump operation sensors 15 may sense when and in some cases how long power is applied to the pump either directly or indirectly.

Pumps 14 may operate for a predetermined time or cycle whereby each cycle may be five minutes, two minutes or the like. If the pump is determined or measured by an installer to pump 100 gallons per minute and each cycle is two minutes, then each cycle would result in 200 gallons of flow. If the permitted threshold for a particular system is 1000 gallons per day and the sensor detects more than five cycles, then the system would be over the permitted threshold, and possibly considered as out of compliance with the permit by server 24 depending on server programming as discussed hereinafter, for the day. Cycles of pump operation may be based on use of timers, float switches as discussed below, or the like. Accordingly, in one embodiment, universal dialer/processor 12 detects and sends pump operation data to server 24 comprising effective time of operation of the pump which may be based on cyclic information, timing a duration of pump operation, or the like. In one embodiment, server 24 is able to interpret the pump information data from the generic or universal dialer/processor 12 based on installer data 20, which is site specific information, or installation data, to determine compliance with the permitted threshold.

In another embodiment, pump operation sensor 15 may directly detect the time of operation of the pump rather than the number of cycles. In this case, the length of time of operation of pump 14 during the period of interest multiplied by the flow rate of the pump, as measured or estimated by the installer or other personnel, determines the amount of fluid processed by the system.

Dialer/processor 12 stores the collected data concerning the amount of time of pump operation or number of cycles, which may be referred to herein as pump operation data. Dialer/processor 12 has enough memory to store data generated by environmental system 16 for any desired period. The processor may time stamp the pump operation data and/or may organize the data into amounts collected daily or during any desired time period and may place the data in groups based on time periods, time stamps, and so forth. For example, the length of time of pump operation could be provided on a daily or hourly basis or for any other period whereby the permitted thresholds are readily determined. If the permit for a particular environmental system 16 is 1000 gallons per day, then the data saved by the corresponding dialer/processor 12 may be arranged so that subsequent processing by server 24 can provide daily usage to regulatory agency 30 for the particular system for the last year or for any other time period. Some or all data that is transmitted can be erased to provide more memory for data produced in the future. Some other non-limiting examples of organization of data by a dialer/processor 12 are discussed in my previous patent.

However, in one embodiment of the present invention the total amount of time or length of time of pump operation data for a permitted time period in itself does not determine the amount of fluid processed by an environmental system 16 because the flow rate of each pump 14 must also be known. After installation or upgrade of an environmental system 16, which can also sometimes be referred to as a wastewater treatment system or treatment system 16, the installer can measure or estimate the flow rate of the pump to thereby determine a calibration factor or number along which the time of pump operation is utilized to determine the volume of fluid versus the permitted threshold for system 16. For example, the flow rate of the pump may be multiplied by the time of operation in a particular time period to obtain the amount of fluid processed by a particular system 16 for the particular time period. Identical pumps 15 may have different flow rates due the variables in each installation discussed above such as, but not limited to, different size, orientation, configuration, or length pipes 18. The installer can measure or estimate pump flow rate after the installation is complete so that this information, which is site specific information, and may be referred to as site specific data, installation data, or installer data 20 is known with respect to each environmental system 16. Other site specific installer data 20 may comprise the permitted threshold per time period of fluid to be processed, e.g., 1000 gallons per day, locations, pump specifications, manufacturer specification, on site data and the like. Installation data or installer data 20 may not be from an original installer or from an upgrade installer but is typically information relevant to installation or repairs for a specific installation. Accordingly, installation or installer data 20 is data that is site specific and may comprise onsite data manufacturing specifications, on site specifications, or the like. Moreover site specific information or installer data 20 may change over time, e.g., an older pump may not pump as much as the pump did when originally installed.

Accordingly, installers, upgrade personnel, repair personnel or others with site specific information may provide what is often referred to herein as installation data, site specific data or installer data 20 to server operator 22 such as but not limited to the pump flow rate and/or the permitted flow rate per time period according to the regulatory permit for each particular system 16. Alternatively, in another embodiment, installation or installer data or site specific data 20 can be sent directly to server 24. Installer data or site specific data 20 can be operatively sent by the installer or other personnel to server 24 by various means including paper forms, online forms, cell phone or work pad applications, and the like. According to the present invention, site specific data or installer data 20 comprises information about a specific site that is used in conjunction with data produced by dialer/processor 12 to provide useful information to authorized third parties such as the regulatory agencies. In other words, site specific data or installer data 20 is utilized to interpret and/or correct the meaning of the data produced by universal or standardized dialer/processor 12 by server 24 without the need to input information or update dialer/processor 12 with information that is site specific.

As another example of cyclic pump operation, in one embodiment, pump flow rate information for fluid use by each environmental system 16 may be provided using a liquid level detector, e.g., one or more float switches that may turn on and off at certain predetermined fluid levels. In this case, the number of times the pump operation sensor 15 detects float switch operation or other liquid level detector operation can be used to determine the volume of fluid pumped assuming the float switches or other liquid level detectors are calibrated to provide this information, which the installer or other service personnel may provide or which may be set for a particular environmental system by the manufacturer. The volume of fluid pumped per cycle is site specific or installer data 20 while the number of reported cycles would be available as data updates from dialer/processor 12.

In a preferred embodiment, to minimize the number of calls made by dialer/processor 12, the pump operating time data collected by the dialer/processor and other data, some non-limiting types of which have been discussed hereinbefore, is sent to the server periodically rather than immediately after an instance of non-compliant operation of the environmental system is detected. The maximum reporting period can be predetermined and programmed into the dialer/processors 12. For example, one presently preferred maximum reporting period is thirty days. When reporting, in one embodiment, at a minimum all data not previously sent to server 24 can be sent for greater efficiency.

Moreover, the reporting period could be adjusted or set during manufacturing as desired to be longer or shorter than 30 days without the need for the installer to input this information during installation or upgrade. Each dialer/processor 12 may be programmed by the manufacturer to utilize the same maximum reporting period but could also use different maximum reporting periods. In either case, the number of phone calls for data transmission is limited. However, exceptions to the maximum reporting period for dialer/processor downloading data to server 24 are discussed below and include reporting whenever predefined events occur.

By using a predetermined maximum time period to report in this embodiment, dialer/processor 12 can operate without regard to the permitted threshold of processed fluid per time period in accord with the present invention. Accordingly, in this embodiment, the plurality of universal, identical, standardized, duplicate or substantially identical dialer/processors 12 do not need the permitted threshold information and/or do not necessarily need flow rate information in order for server 24 to provide suitable information for regulatory agency 30. Instead, the plurality of dialer/processors 12 may simply report the recorded pump operation data about the time of operation of each pump 14 for each environmental system 16 to server 24. Server 24 can then utilize the installer data 20 for each environmental system 16, such as the permitted threshold and flow rate of the pump, along with the recorded pump operation data from dialer/processors 12 to determine whether and when any non-compliant operation has occurred for any of the plurality of environmental systems 16. Server 24 can then provide information concerning compliance and lack of compliance to regulatory agency 30, service companies 28, and system owners 26.

The predetermined period for dialer/processors 12 to send accumulated data to server 24 limits the number of times data is sent thereby reducing communication costs, which benefits the environmental system owners. However, in a preferred embodiment, various predefined events can also be utilized to trigger an upload of data from the dialer/processors 12 to server 24. As one example, one or more event electronic detectors 32 may detect system problems or activity that requires a response from service companies 28. Many examples of such events are discussed in the previous patents referenced hereinbefore including ongoing readings, which do not return to normal readings within a designated time period, such as high motor current, low motor current, power outage, improper float levels, pH levels, high or low aerator pressure, high or low dissolved oxygen levels, and the like. The occurrence of an event detected by electronic detectors 32 activates programming and operation of the respective dialer/processor 12 to contact server 24.

Other predefined events can include service personnel detected by electronic detectors 32, e.g., as a result of service personnel pushing a button or series of buttons to input a code. If a predefined event occurs for which dialer/processor 12 is programmed to report to server 24, then to reduce the required number of calls, and for the sake of efficiency, the accumulated data will be sent at that time rather than waiting until the predetermined period is over. A new predetermined period, e.g., 30 days, or once a month at a particular time and/or date may then be started after the event that triggered the report so that the times of reporting with respect to the dates can change. Alternatively, the next reporting time may be skipped or delayed and reporting using the same time periods or date of reporting could begin again. Accordingly, the number of communications is limited and cost of data transmission is reduced. The maximum reporting time, which could be in one non-limiting example 30 days from the last reporting, can also be used as a type of heartbeat signal so that if server 24 does not receive data at an expected time or range of times, then server 24 may contact a respective service company 28 or homeowner 26 to check on the environmental system.

Server 24 can provide a history of operation of all environmental systems 16 to regulatory agency 30, which are overseen by the regulatory agency. As noted above, in one embodiment, server 24 will have the permitted thresholds for each environmental system and will be able to calculate and store and/or report the amount of fluid processed in a desired time period of interest. For example, if the permitted threshold is 1000 gallons per day, and on one or more days 2000 gallons is processed, then regulatory agency 30 can be apprised of the non-compliance for each period or multiple non-compliances within a selectable time period. On this basis, the regulatory agency will have a record upon which to evaluate operation of the system.

As one non-limiting example, server 24 can generate a report based on selected criteria that results in requirements for a different permit with a higher permitted threshold to accommodate the amount fluid processed based on the history of operation of an environmental system.

The usage per time period can be made available for many different types of already prepared and/or individually tailored reports. The regulatory agency can request reports that are formatted in the desired way, by location or area, by compliance or lack of compliance, by date range, by the severity of non-compliance, repetitive non-compliance problems, and the like. The reports can show usage, e.g., amount of fluid processed, on a daily basis or in any selected time periods. A regulator may want to see only data concerning non-compliance and might select instances of non-compliance for the previous year or years of operation. As well, the regulators may wish to see only data concerning units which are non-compliant by a specified amount over the permitted threshold, e.g., 1200 gallons per day for treatment systems rated at 1000 gallons per day.

Other types of historical data such as alarms, events, service times in response to alarms based on electronic personnel detectors as part of detectors 32, or the like, can also be made available. Accordingly, operation data including volume of wastewater processing, service history, maintenance schedules, and the like can be available from server 24. Likewise, other operation data including information about the owners, service contracts, type of environmental system, length of time of operation, and the like can also be available.

Server 24 communicates with, can be accessed, and/or can send operation data to authorized third parties, which include system owners 26, service companies 28, and regulatory agencies 30. Generally data access is provided by a website and password and any desired method of communication can be utilized including cell phone, cell phone applications, fax, iPad, email, radio, or the like. Other examples of ways that authorized third parties and server 24 communicate with each other can be found in my previous patents.

The appropriate regulatory agency has access to operation data associated the environmental systems 16 for which it is associated. If more than one regulatory agency 30 is involved then each agency can be limited to accessing data for environmental systems 16 for which it is associated or authorized. In some cases local agencies or authorities such as subdivision, neighborhood, or the like authorities may perform the oversight and be authorized third parties and could be considered regulatory agencies or agents of regulatory bodies for monitoring purposes. Service companies preferably have their access limited to operation data for the environmental systems for which they are under contract for service. Owners preferably will have access only to operation data for the units which they are responsible for. Access to server 24 data can be limited by passwords, information encryption keys, and/or other means as desired. Accordingly, authorized third parties include agencies, service companies, and system owners.

Server operator 22 maintains server 24, inputs site specific data as necessary, which may include pump rates, permitted threshold levels, and other information necessary to operation of server 24, including a wide range of installer data 22. The information and/or programming of server 24 can be changed or corrected as desired without the need to change programming or input data into individual environmental systems 16.

Server operator 22 can utilize server 24 outputs to check operation of sensors at particular environmental systems 16. For example, if a particular environmental system frequently reports overuse in processing, service personnel may check whether the provided flow rates of the pump are correct and if not then this information could be changed at server 24 rather than dialer/processor 12. If a pump processes less or more fluid or has a higher or lower flow rate than the pump did when installed, or if the installer does not measure or estimate the flow rate correctly, or if the flow rate changes over time due to pump or component wear, this site specific information, which is also referred to as installer data herein, can be changed or updated in server 24 without making changes to dialer/processor 12 at the particular environmental system 16 of interest. Accordingly, the present invention more conveniently and efficiently allows for changes to data to be made at server 24 rather than requiring updates at a specific dialer/processor 12.

Accordingly, the present invention may be utilized to provide large amounts of data to regulatory agencies at low cost that verifies environmental safety of operation of tens of thousands small environmental systems.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A method of determining regulatory compliance of a plurality of environmental systems, a regulatory body designating each of said plurality of environmental systems with a respective permitted threshold for a predetermined amount of wastewater to be processed within a predetermined period of time, said method of determining requlatory compliance comprising:
    providing that each of said plurality of environmental systems are operable for processing less than 5000 gallons of wastewater within a designated amount of time;
    providing a plurality of pumps for said plurality of environmental systems so that each of said plurality of environmental systems comprises a pump;
    providing said plurality of environmental systems with a plurality of universal dialers so that each of said plurality of environmental systems comprises a universal dialer, each universal dialer comprises a processor operatively connected to a respective pump and configured to receive and transmit pump operation data related to operation of said respective pump without processing said pump operation data to determine compliance with said respective permitted threshold;
    configuring said processor to operate each universal dialer to periodically connect to a server upon a first occurrence of at least one of a predetermined time period or a predefined event, and when connected, to transmit said pump operation data;
    configuring said server to receive installation data comprising said respective permitted threshold for each of said plurality of environmental systems and utilizing said server to determine whether each respective of said plurality of environmental systems is in compliance with said respective permitted threshold; and
    configuring said server to provide an authorized third party with processed data indicative of whether respective of said plurality of environmental systems for which said authorized third party is authorized are in compliance with said respective permitted threshold.

2. The method of claim 1, further comprising that whereupon said processor operates said a respective universal dialer to transmit said pump operation data due to said predefined event, then a subsequent predetermined time period begins with said predefined event.

3. The method of claim 1, wherein said installation data further comprises a respective pump flow rate of each of said plurality of pumps.

4. The method of claim 3, wherein said pump operation data further comprises time of operation of each of said plurality of pumps.

5. The method of claim 4, wherein said server is programmed to determine a volume of fluid processed for a selected period of treatment time utilizing said respective pump flow rate of each of said plurality of pumps and said time of operation of each of said plurality of pumps.

6. The method of claim 1, wherein said pump operation data is produced utilizing a pump operation sensor operable for detecting operation of a liquid level detector.

7. The method of claim 1, wherein said pump operation data is produced utilizing a pump operation sensor operable for detecting cyclical pump operation.

8. The method of claim 1, wherein said pump operation data is produced utilizing said processor for timing operation of said respective pump.

9. The method of claim 1, wherein said server is operable to provide said regulatory body with a record of compliance comprising a volume of fluid processed for a selected number of said predetermined periods of time for each of said plurality of environmental systems.

10. The method of claim 1, wherein said server is selectively operable to provide said regulatory body with a record of only non-compliant of said predetermined periods of time for selected of said plurality of environmental systems.

11. The method of claim 1, comprising providing that each of said plurality of environmental systems are operable for processing less than 5000 gallons of wastewater per day.

12. A method of determining regulatory compliance of a plurality of environmental systems, a regulatory body designating each environmental system with a permitted threshold for a predetermined amount of wastewater to be processed within a predetermined period of time, said method of determining regulatory compliance comprising:
  providing that each of said plurality of environmental systems are operable for processing less than 5000 gallons of wastewater within a designated period of time;
  providing a plurality of pumps for said plurality of environmental systems so that each of said plurality of environmental systems comprises a pump;
  providing said plurality of environmental systems with a plurality of universally programmed dialers so that each of said environmental systems comprises a universal dialer, each universal dialer comprises a processor operatively connected to a respective pump and being configured to receive and transmit pump operation data comprising an effective time of operation of said respective pump;
  configuring said processor to connect to a server without regard to a respective permitted threshold for a respective environmental system, and further configuring said processor to operate said universal dialer to periodically connect to said server upon a first occurrence of at least one of a predetermined time period or a predefined event, and when connected, to transmit said pump operation data for said respective environmental systems;
  configuring said server to process said pump operation data received from said plurality of environmental systems; and
  configuring said server to provide an authorized third party with processed data indicative of whether each of said plurality of environmental systems for which said authorized third party is authorized are in compliance with said permitted threshold.

13. The method of claim 12, further comprising when said processor operates a respective universal dialer to transmit said pump operation data due to said predefined event, then a subsequent predetermined time period begins with said predefined event.

14. The method of claim 12, further comprising that when said processor operates a respective universal dialer to transmit said pump operation data due to said predefined event or said predetermined time period, then said processor transmits at a minimum all data not previously transmitted.

15. The method of claim 12, further comprising configuring said server to receive installation data comprising said permitted threshold and a respective pump flow rate for said plurality of pumps for each of said plurality of environmental systems for use in determining whether each of said plurality of environmental systems is in compliance with said permitted threshold.

16. The method of claim 15, wherein said server is programmed to determine a volume of fluid processed for a selected period of time utilizing said respective pump flow rate of each of said plurality of pumps and said a time of operation of each of said plurality of pumps.

17. The method of claim 16, wherein said server is operable to provide said regulatory body with a record of compliance comprising a volume of fluid processed for a selected number of said predetermined periods of time.

18. The method of claim 17, wherein said server is selectively operable to provide said regulatory body with a record of only non-compliant predetermined periods of time.

19. A system for determining regulatory compliance of a plurality of environmental systems, a regulatory body designating each environmental system with a permitted threshold for a predetermined amount of wastewater to be treated within a predetermined period of time, said system comprising:
  a plurality of pumps for said plurality of environmental systems so that each of said plurality of environmental systems comprises a pump;
  a plurality of universally programmed dialers for said plurality of environmental systems so that each environmental system comprises a respective universally programmed dialer, each of said plurality of universally programmed dialers comprising a processor operatively connected to at least one respective pump of said plurality of pumps, each of said plurality of universally programmed dialers being configured to receive and transmit pump operation data; and
  a server, said processor being configured for connecting said respective universally programmed dialer to said server without regard to a respective permitted threshold for said predetermined amount of wastewater to be treated within said predetermined period of time for each of said plurality of environmental systems, said processor being configured to transmit said pump operation data for said plurality of environmental systems, said server being configured to process said pump operation data received from said plurality of environmental systems for determining compliance with said permitted threshold, said server being configured to provide an authorized third party with processed data indicative of whether respective of said plurality of environmental systems for which said authorized third party is authorized are in compliance with said permitted threshold.

20. The system of claim 19, further comprising said processor being configured to operate said respective universally programmed dialer to periodically connect to a server upon a first occurrence of a predetermined time period or a predefined event, so that when said processor operates said respective universally programmed dialer to transmit said pump operation data due to said predefined event, then a subsequent predetermined time period begins with said predefined event.

21. The system of claim 19, further comprising said server being configured to receive installation data comprising said permitted threshold and a respective pump flow rate for said plurality of pumps for each of said plurality of environmental systems, said server being configured to utilize said installation data and said pump operation data to determine whether each of said plurality of environmental systems is in compliance with said permitted threshold.

22. The system of claim 21, further comprising said pump operation data comprising an effective time of operation of each of said plurality of pumps.

23. The system of claim 22, further comprising said server being configured to determine a volume of fluid processed for a selected period of time utilizing said respective pump flow rate of each of said plurality of pumps and said effective time of operation of each of said plurality of pumps.

24. The system of claim 23, further comprising said server being configured to provide said regulatory body with a record of compliance comprising a volume of fluid processed for a selectable number of said predetermined periods of time.

25. The system of claim 19, further comprising said server being selectively operable by said regulatory body to provide said regulatory body with a record of only non-compliant predetermined periods of time.

26. A method of determining regulatory compliance of a plurality of environmental systems, a regulatory body designating each of said plurality of environmental systems with a respective permitted threshold for a predetermined amount of wastewater to be processed within a predetermined period of time, said method of determining regulatory compliance comprising:
   providing that each of said plurality of environmental systems are operable for processing less than 5000 gallons of wastewater within a designated amount of time;
   providing a plurality of pumps for said plurality of environmental systems so that each of said plurality of environmental systems comprises a pump;
   providing said plurality of environmental systems with a plurality of universal dialers so that each environmental system comprises a universal dialer, each universal dialer comprises a processor operatively connected to a respective pump and configured to receive and transmit pump operation data related to operation of said respective pump without processing said pump operation data to determine compliance with said respective permitted threshold;
   configuring a server to receive installation data comprising site specific information for each of said plurality of environmental systems and utilizing said server to interpret said pump operation data using said installation data to determine whether each of said plurality of environmental systems is in compliance with said respective permitted threshold; and
   configuring said server to provide an authorized third party with processed data indicative of whether respective of said plurality of environmental systems for which said authorized third party is authorized are in compliance with said respective permitted threshold.

27. The method of claim 26, further comprising updating said installation data utilized for at least one specific environmental system by said server to interpret said pump operation data in a manner that affects a determination of whether said at least one specific environmental system is in compliance with said respective permitted threshold.

28. The method of claim 27, further comprising updating said installation data to revise a pump flow rate for said at least one specific environmental system is in compliance with said respective permitted threshold.

* * * * *